(12) United States Patent
Ichihara (10) Patent No.: US 6,922,451 B1
(45) Date of Patent: Jul. 26, 2005

(54) FREQUENCY SHIFTING CIRCUIT AND METHOD

(75) Inventor: Masaki Ichihara, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/549,279

(22) Filed: Apr. 14, 2000

(30) Foreign Application Priority Data

Apr. 15, 1999 (JP) .......................................... 11-108333

(51) Int. Cl.$^7$ .......................... H03D 3/00; H04L 27/14; H04L 7/00
(52) U.S. Cl. ...................... 375/334; 375/332; 375/344; 329/300; 329/304
(58) Field of Search .............................. 375/261, 134, 375/130, 142, 148, 326, 331, 272, 273, 279, 281, 329, 332, 334, 344; 370/320, 203; 327/248; 708/300; 329/300, 304

(56) References Cited

U.S. PATENT DOCUMENTS

| | | | | |
|---|---|---|---|---|
| 4,737,724 A | * | 4/1988 | Porrot | 327/248 |
| 6,097,712 A | * | 8/2000 | Secord et al. | 370/335 |
| 6,104,708 A | * | 8/2000 | Bergamo | 370/320 |
| 6,151,368 A | * | 11/2000 | Cochran | 375/326 |
| 6,167,102 A | * | 12/2000 | Hellberg | 375/376 |
| 6,317,412 B1 | * | 11/2001 | Natali et al. | 370/208 |

FOREIGN PATENT DOCUMENTS

| | | |
|---|---|---|
| EP | 0 486 095 A1 | 5/1992 |
| EP | 0 741 478 A2 | 11/1996 |
| JP | 62-79522 | 4/1987 |
| JP | 1-151341 | 6/1989 |
| JP | 2-29821 | 1/1990 |
| JP | 7-46286 | 2/1995 |
| JP | 7-221806 | 8/1995 |
| JP | 8-46654 | 2/1996 |
| JP | 8-331096 | 12/1996 |
| JP | 9-284242 | 10/1997 |
| JP | 10-79718 | 3/1998 |
| JP | 2000-252866 | 9/2000 |
| WO | WO 98/34382 | 8/1998 |

OTHER PUBLICATIONS

Nahm et al., "A Cordic–Based Digital Quadrature Mixer: Comparison with a Rom–Based Architecture", School of Electrical Engineering, Seoul National University, IEEE International Symposium on Monterey, CA, U.S.A., pp. 385–388 (May 31–Jun. 3, 1998).

Jack E. Volder, "The CORDIC Trigonometric Computing Technique", IRE Transactions on Electronic Computers, pp. 330–334 (Sep. 1959).

* cited by examiner

Primary Examiner—Young T. Tse
Assistant Examiner—Edith Chang
(74) Attorney, Agent, or Firm—Dickstein, Shapiro, Morin & Oshinsky, LLP.

(57) ABSTRACT

This invention is regarding a frequency shifting circuit suitable for a digital demodulator in a multi-carrier communications system. After converting analog signal vectors to the input signal vectors according to a predetermined sampling clock, control data is generated from a frequency difference between sub-carrier bands and center carrier band. A signal vector rotator is provided corresponding to each of the sub-carrier bands and rotates the input signal vectors on the I-Q plane by an angle determined depending on corresponding control data to shift the sub-carrier bands of the input signal vectors to the center carrier band. A band-pass filter passes an output signal vector of the center carrier band.

6 Claims, 8 Drawing Sheets

| k | $2^{-k}$ | $\theta_k = \arctan(2^{-k})$ | $\cos \theta_k$ | $45 \times 2^{-k}$ |
|---|---|---|---|---|
| 0 | 1.0000000000 | 45.0000000000 | 0.70710067812 | 45.0000000000 |
| 1 | 0.5000000000 | 26.5650511771 | 0.8944271910 | 22.5000000000 |
| 2 | 0.2500000000 | 14.0362434679 | 0.9701425001 | 11.2500000000 |
| 3 | 0.1250000000 | 7.1250163489 | 0.9922778767 | 5.6250000000 |
| 4 | 0.0625000000 | 3.5763343750 | 0.9980525785 | 2.8125000000 |
| 5 | 0.0312500000 | 1.7899106082 | 0.9995120761 | 1.4062500000 |
| 6 | 0.0156250000 | 0.8951737102 | 0.9998779520 | 0.7031250000 |
| 7 | 0.0078125000 | 0.4476141709 | 0.9999694838 | 0.3515625000 |
| 8 | 0.0039062500 | 0.2238105004 | 0.9999923707 | 0.1757812500 |
| 9 | 0.0019531250 | 0.1119056771 | 0.9999980927 | 0.0878906250 |
| 10 | 0.0009765625 | 0.0559528919 | 0.9999995232 | 0.0439453125 |
| 11 | 0.0004882813 | 0.0279764526 | 0.9999998808 | 0.0219726563 |
| 12 | 0.0002441406 | 0.0139882271 | 0.9999999702 | 0.0109863281 |
| 13 | 0.0001220703 | 0.0069941137 | 0.9999999925 | 0.0054931641 |
| 14 | 0.0000610352 | 0.0034970569 | 0.9999999981 | 0.0027465820 |
| 15 | 0.0000305176 | 0.0017485284 | 0.9999999995 | 0.0013732910 |

FIG. 10

FREQUENCY SHIFTING CIRCUIT AND METHOD

BACKGROUND OF THE INVENTION

1. Field of the Invention

The present invention relates to frequency shifting techniques suitable for a demodulator of a receiver in a multi-carrier communications system.

2. Description of the Related Art

In next generation mobile communications systems, much attention is focused on IMT-2000 (International Mobile Telecommunications-2000) system defined by ITU-R TG 8/1. There have been proposed several systems such as W-CDMA (Wideband-Code Division Multiple Access) and cdma2000, which may employ a multi-carrier scheme to allow high-speed data transmission.

Figure 10:
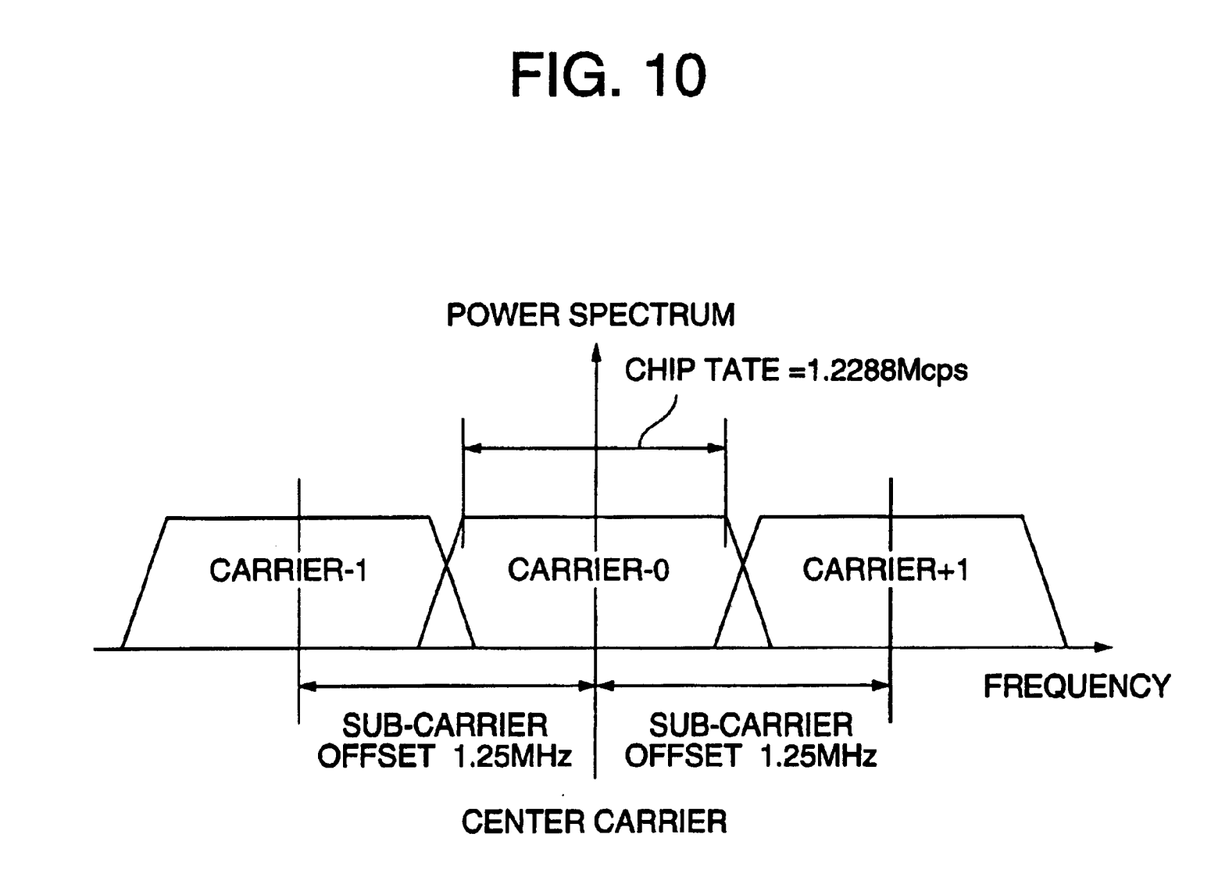
FIG. 10 is a schematic diagram showing an example of a power spectrum of a multi-carrier signal.

The cdma2000 system is designed to realize upward compatibility with cdmaOne conforming to IS-95 and is likely to employ a multi-carrier scheme in downlink transmission. An example of the multi-carrier scheme in CDMA communications is shown in FIG. 10. In this example, it is assumed that the frequency offset of sub-carriers (Carrier−1 and Carrier+1) from the center carrier is 1.25 MHz and the chip rate is 1.2288 Mcps. In the cdmaOne communications, data can be transmitted at 14.4 kbps using a single carrier (center carrier). In contrast, the multi-carrier cdma system allows a maximum data rate of 43.2 kbps using three carriers.

To successfully receive such a multi-carrier signal, the simplest is to provide a different receiver dedicated to each of a plurality of carriers. However, the number of receivers to be needed increases as the number of carriers increases, resulting in increased amount of hardware and increased power consumption.

Another solution is that a single receiver is provided to receive signals on all the carriers and a digital baseband processor individually processes the received signals according to carrier frequencies. There have been proposed several methods for handling a received signal for each of a plurality of carriers.

In Japanese Patent Unexamined Publication No. 7-221806, a demodulator employing time division multiplexing scheme has been disclosed. More specifically, the respective carriers are identified by time slots of the time division multiplexing scheme and I- and Q-component signals for each carrier are frequency-shifted to produce baseband I- and Q-component signals for the center carrier by phase rotation computation.

In Japanese Patent Unexamined Publication No. 8-46654, a demodulator employing a carrier selection means at an input stage has been disclosed. More specifically, one of a plurality of carriers is selected according to carrier designation data. Only a signal of the selected carrier is subjected to quadrature frequency conversion to produce I- and Q-component signals and the I- and Q-component signals for each carrier are frequency-shifted to produce baseband I- and Q-component signals for the center carrier by phase rotation computation.

In Japanese Patent Unexamined Publication No. 10-79718, a demodulator employing a Fast Fourier Transformer (FFT) for used in an OFDM (orthogonal frequency division multiplex) receiver has been disclosed. The FFT can be used to separate a plurality of carriers.

In the above prior arts, however, a ROM and a complex multiplier are needed for phase shifting and therefore there is disclosed no effective means for avoiding complication of the circuit, increase of the circuit scale, and increase of power consumption. A multi-carrier receiver having a small circuit scale and saving power is not realized.

SUMMARY OF THE INVENTION

Therefore, an object of the present invention is to provide a frequency shifting circuit and method suitable for a digital demodulator in a multi-carrier communications system.

Another object of the present invention is to provide a frequency shifting circuit and method suitable for a small-sized portable CDMA receiver.

According to an aspect of the present invention, a digital circuit for shifting a frequency band of a signal vector to a predetermined frequency band, wherein the signal vector is determined by a pair of I (in-phase) and Q (quadrature) components on I-Q plane, includes:

a control data generator for generating control data from a frequency difference between the frequency band and the predetermined frequency band; and a signal vector rotator for rotating the signal vector on the I-Q plane by an angle determined depending on the control data to produce an output signal vector in the predetermined frequency band.

According to another aspect of the present invention, a digital circuit for shifting a plurality of frequency bands of input signal vectors to a predetermined center frequency band to produce an output signal vector for each frequency band, wherein each of the input signal vectors is determined by a pair of I (in-phase) and Q (quadrature) components on I-Q plane, includes:

an analog-to-digital converter for converting analog signal vectors to the input signal vectors according to a predetermined sampling clock;

a control data generator for generating control data from a frequency difference between each of the plurality of frequency bands and the predetermined center frequency band;

a signal vector rotator corresponding to each of the plurality of frequency bands, for rotating the input signal vectors on the I-Q plane by an angle determined depending on corresponding control data to shift the frequency bands of the input signal vectors to the predetermined center frequency band; and a band-pass filter corresponding to the signal vector, for receiving an output of the signal vector rotator and passing an output signal vector of the predetermined center frequency band.

The control data generator preferably includes a phase data generator for generating phase data $\Phi$ from the frequency difference in synchronization with the predetermined sampling clock, and a converter for converting the phase data $\Phi$ to the control data D consisting of a plurality of control bits $D_k$, where $-1 \leq k \leq m-2$ (m is a positive integer).

The phase data generator preferably generates the phase data $\Phi$ by computing an integral multiple of a unit angle $\Delta$ which is obtained from a frequency shift $\delta$ per period of the predetermined sampling clock, wherein the unit angle $\Delta$ is represented by $360° \times \delta$, wherein the frequency shift $\delta$ is obtained by dividing the frequency difference by a frequency of the predetermined sampling clock and is represented in form of $RN/2^m$ (RN is an rational number).

The converter preferably performs a conversion operation according to the following steps:

Step 1) k=−1 and $\Phi_k=\Phi$;

Step 2) $D_k$=sign bit of $\Phi_k$;

Step 3) if k=m−2, then exit, else go to step 4);

Step 4) $\Phi_{k+1}=\Phi_k-\theta_k$ when $D_k=0$, and
$\Phi_{k+1}=\Phi_k+\theta_k$ when $D_k=1$,
where $\theta_k=\arctan(2^{-k})$;

Step 5) k=k+1; and

Step 6) go to step 3).

The signal vector rotator preferably includes a plurality of partial rotators $R_k$ which are connected in series in descending order of a rotation angle, wherein the partial rotators $R_k$ receive the control bits $D_k$, respectively, and each of the partial rotators $R_k$ rotates an output of a previous stage $R_{k-1}$ by a predetermined angle depending on a corresponding control bit received from the converter.

In the plurality of partial rotators, a first partial rotator $R_{-1}$ rotates an input signal vector $(I_{in}, Q_{in})$ by an angle $\theta_{-1}$ to produce a first output signal vector $(I_{out,-1}, Q_{out,-1})$ as follows: $I_{out,-1}=D_{-1}\times Q_{in}$ and $Q_{out,-1}=-D_{-1}\times I_{in}$.

Further, each of partial rotators $R_k$ (0≦k≦m−2) rotates an input signal vector $(I_{in,k}, Q_{in,k})$ by an angle $\theta_k$ to produce an output signal vector $(I_{out,k}, Q_{out,k})$ as follows:

$$I_{out,k}=I_{in,k}+2^{-k}\times D_k\times Q_{in,k}; \text{ and}$$

$$Q_{out,k}=-2^{-k}\times D_k\times I_{in,k}+Q_{in,k},$$

where $D_k$ uses numerical value representation such that a numerical value "1" is represented by a logical value "1" and a numerical value "−1" is represented by a logical value "0".

The signal vector rotator rotates an input signal vector $(I_{in}, Q_{in})$ having an absolute value $Z_{in}$ by an angle $\Theta$ while the absolute value $Z_{in}$ becomes $Z_{out}$, where $\Theta$ and $Z_{out}$ are represented as follows:

$$\Theta = D_{-1}\times 90° + \sum_{k=0}^{m-2} D_k\cdot\arctan(2^{-k}) \text{ and}$$

$$Zout = \frac{Zin}{\prod_{k=0}^{m-2}\cos\theta_k}.$$

Since a signal vector determined by the input I and Q components is rotated around the origin of the I-Q plane to be frequency-shifted to the center carrier band, the respective signal vectors of the frequency bands are obtained in the center carrier band.

Further, in multi-carrier communications, especially in multi-carrier CDMA communications, the present invention can provide a frequency shifting circuit without the need of ROM and multiplier, which is simplified, reduced in power consumption, and suitable for a small-sized portable terminal. Since the frequency shifting circuit rotates a signal vector on the I-Q plane by means of digital computation, it is possible to demodulate received signals in the upper and lower bands into signals in the center band with extremely high precision.

DESCRIPTION OF THE PREFERRED EMBODIMENT

Hereafter, a preferred embodiment of the present invention will be described by referring to the drawings.

A frequency shifting demodulation circuit according to the present invention includes a well-known quadrature frequency converter (not shown) that reproduces In-phase (I) components and Quadrature (Q) components from received signals according to the quadrature modulation scheme.

Here, it is assumed, as shown in FIG. 10, that the I and Q components are reproduced from received signals on the center carrier and the two sub-carriers. Frequencies of the sub-carriers are shifted from the center carrier by the same amounts in the lower-frequency and higher-frequency directions, respectively. In this example, the frequency offset of each sub-carrier is 1.25 MHz and the chip rate is 1.2288 Mcps. As described before, since the number of carriers is 3, a maximum data rate of 43.2 kbps can be obtained.

Figure 1:
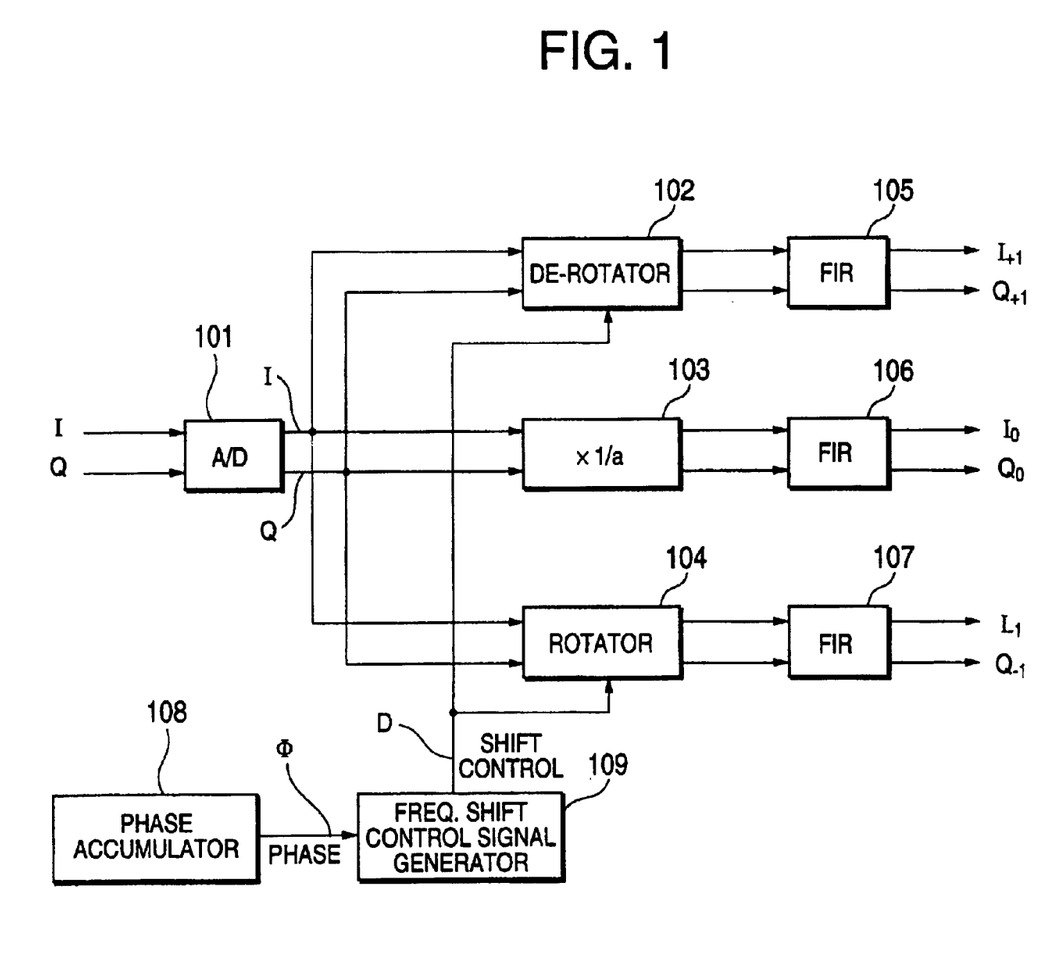
FIG. 1 is a block diagram showing a circuit of a demodulation circuit employing a frequency shifting circuit according to an embodiment of the present invention.

As shown in FIG. 1, the frequency shifting demodulation circuit further includes an analog-to-digital (A/D) converter 101 which causes the input I and Q components to be converted into digital form according to a sampling rate clock having a sampling rate which is eight times the chip rate. The A/D converter 101 outputs digital I and Q components to each of a de-rotator (or a negative frequency shifter) 102, a non-rotator (or a non-shifter) 103, and a rotator(or a positive frequency shifter) 104. The de-rotator 102, the non-rotator 103, and the rotator 104 are connected to finite impulse response (FIR) filters 105, 106 and 107, respectively. The FIR filters 105, 106 and 107 have the same band-pass filtering characteristic for the center carrier Carrier–0 and output signals $I_{+1}$ and $Q_{+1}$ for higher sub-carrier Carrier+1, signals $I_0$ and $Q_0$ for center carrier Carrier–0, and signals $I_{-1}$ and $Q_{-1}$ for lower sub-carrier Carrier–1 to corresponding despreaders (not shown), respectively. As described later, a phase accumulator 108 generates phase data $\Phi$ from a predetermined sampling-rate clock and a frequency shift control signal generator 109 converts the phase data $\Phi$ to frequency shift control data D and outputs it to each of the de-rotator 102 and the rotator 104.

The de-rotator 102 decreases the frequency of I and Q components from the frequency of the sub-carrier Carrier+1 to the center carrier frequency band by rotating a signal point determined by the I and Q components for the sub-carrier Carrier+1 around the origin of an I-Q plane. Here, the amount of frequency shift is −1.25 MHz. The non-rotator 103 does not shift the frequency of the center carrier but performs gain and timing compensation. The rotator 102 increases the frequency of I and Q components from the frequency of the sub-carrier Carrier−1 to the center carrier frequency band by rotating a signal point determined by the I and Q components for the sub-carrier Carrier−1. Here, the amount of frequency shift is +1.25 MHz.

In this manner, the respective input signal vectors of the sub-carriers Carrier+1 and Carrier−1 are shifted to the frequency band of the center Carrier−0 and therefore the respective signal vectors ($I_{+1}$, $Q_{+1}$), ($I_0$, $Q_0$), and ($I_{-1}$ and $Q_{-1}$) are output through the FIR filters 105, 106 and 107 having same band-pass filtering characteristic for the center carrier Carrier−0.

Phase Accumulator

Figure 2:
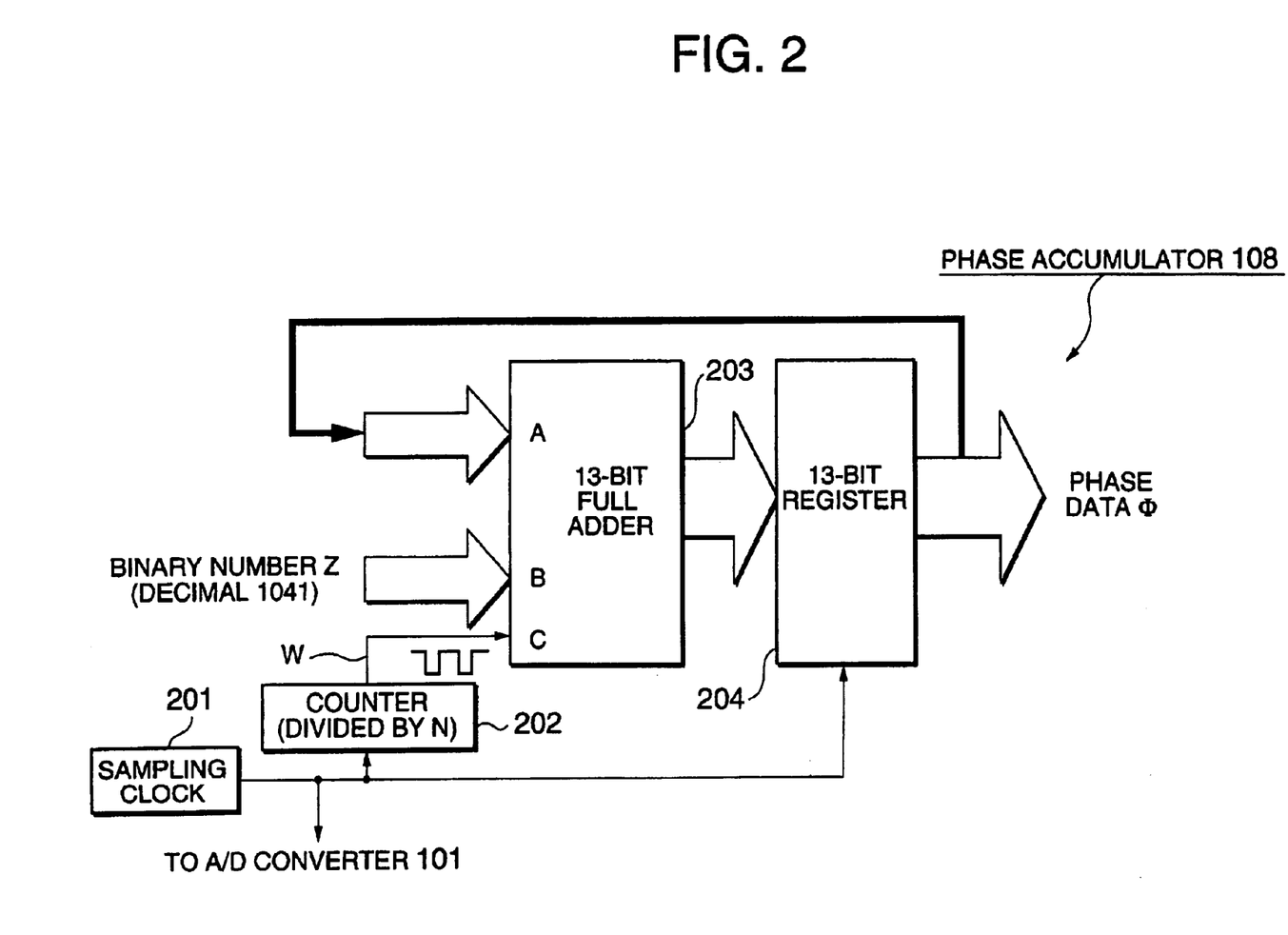
FIG. 2 is a block diagram showing a phase accumulator used in the frequency shifting circuit of FIG. 1.

Referring to FIG. 2, the phase accumulator 108 is composed of a sampling-rate clock generator 201, a counter 202, a full adder 203, and a register 204. As an example, the full adder 203 is a 13-bit full adder and the register 204 is a 13-bit register. A sampling rate clock generated by the sampling-rate clock generator 201 is outputted to the counter 202 and the register 204 as well as the A/D converter 101. An integral multiple or a fraction of the sampling rate clock may be output to the counter 202 and the register 204. The counter 202 divides the sampling-rate clock in frequency by N (here, N=3) and outputs a carry signal W to the full adder 203. The full adder 203 adds the output of the register 204 received at input A, a predetermined binary number Z (here, Decimal 1041) received at input B, and the carry signal W received at input C, the 13-bit register 204 stores the output of the full adder 203 according to the sampling rate clock.

Hereinafter, the chip rate of each carrier is assumed to be 1.2288 Mcps. As for the sampling rate, it is assumed that one chip is sampled by eight-times oversampling compared with the chip rate. Further, it is assumed that the frequency shift of each sub-carrier from the center carrier is 1.25 MHz. At this time, a frequency shift δ per sample is 1.25 MHz/(1.2288 Mchips/sec×8 samples/chip), which is approximately 0.127/sample. Therefore, a product Δ of δ and 360 degrees is approximately 45.7 degrees. By taking Δ as a unit angle, phases in the range of 360 degrees ranging from −180 degrees to +180 degrees are represented by, for example, 13-bit binary numbers. In other words, 360 degrees are divided into $2^{13}$ (=8192) parts. Thus, $2^{12}$ (=4096) angle indication points are provided at equal intervals between −180 degrees and 0 degree, and $2^{12}$ (=4096) angle indication points are provided at equal intervals between 0 degree and +180 degrees. Representing (Δ/360) approximately by using "$2^{13}$", we get $(1041+2/3)/2^{13}$). Converting the decimal number "1041" to a 13-bit binary number Z, we get "0 0100 0001 0001".

As shown in FIG. 2, the full adder 203 is supplied with an output of the 13-bit register 204 as its input A, and is further supplied with the above-described binary number Z, i.e., the decimal number 1041 (hereafter, simply referred to as "1041") as its input B. The full adder 203 adds the A input and the B input which is 1041. Thus, "A+1041" is calculated. Further, to add the fraction 2/3 to the result "A+1041", that is, to calculate "A+(1041+2/3)", the carry signal W output from the counter 202 is input to a carry terminal C of the full adder 203.

Eventually, the result of "A +(1041+2/3)" is output from the 13-bit register 204 as phase data Φ. The 13-bit register 204 holds the output of the full adder 203 at timing (e.g. leading edge) of the sampling-rate clock. In this way, the phase accumulator 108 produces phase data Φ as a binary number equal to the product of the unit angle Δ and a natural number in synchronism with the sampling-rate clock.

Figure 3A:
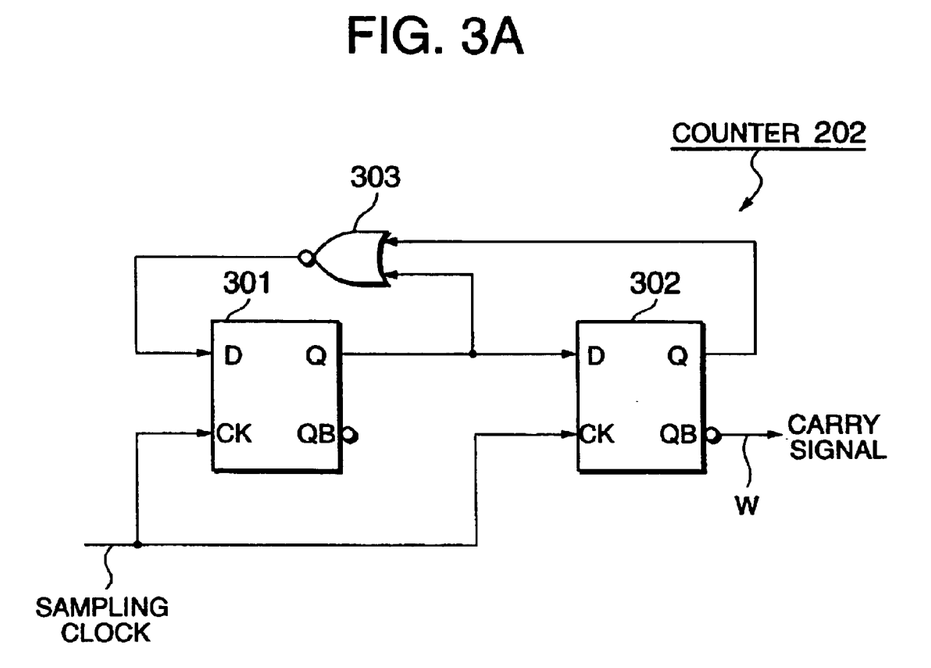
FIG. 3A is a block diagram showing a counter used in the phase accumulator of FIG. 2.

Referring to FIG. 3A, the counter 202 is composed of two D-type flip-flop circuits 301 and 302 and an NOR gate 303. The output Q of the flip-flop circuit 301 is connected to the input D of the flip-flop circuit 302 and the one input of the NOR gate 303. The other input of the NOR gate 303 is connected to the output Q of the flip-flop circuit 302. The output of the NOR gate 303 is connected to the input D of the flip-flop circuit 301. The sampling-rate clock is supplied to both the clock terminals of the flip-flop circuits 301 and 302. The inverted output QB of the flip-flop circuit 302 is output as the carry signal W to the carry input C of the full adder 203. In this example, the counter 202 divides the frequency of the sampling-rate clock by N=3.

Figure 3B:
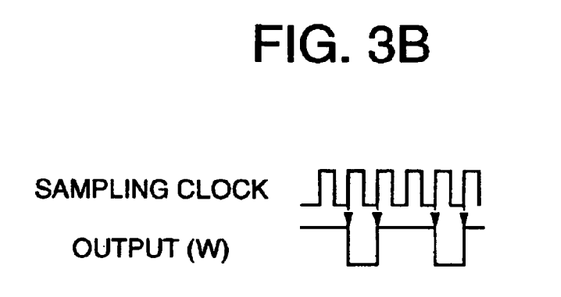
FIG. 3B is a timing chart showing a relationship between a sampling-rate clock and an output of the counter.

As shown in FIG. 3B, the carry signal W, that is, the output of the counter 202 is "1" during two clock periods of the sampling-rate clock, and "0" during one clock period of the sampling-rate clock. Therefore, when the full adder 203 inputs the carry signal W at its carry input C from the count 202, 2 is added to (A+B) every three clock periods. As a result, 2/3 is added to the output of the full adder 203 per clock period.

Freq. Shift Control Signal Generator

Figure 4:
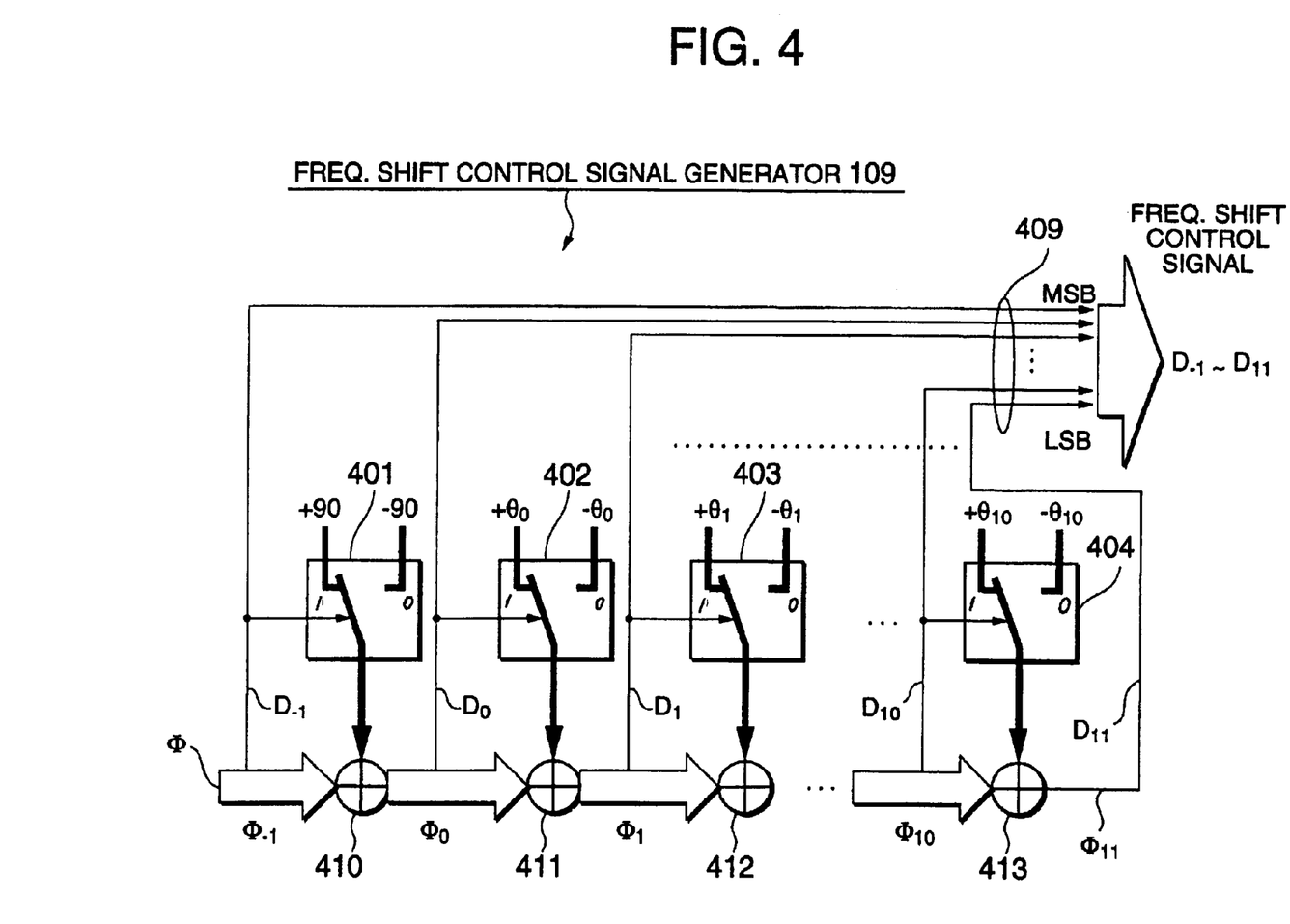
FIG. 4 is a block diagram showing a frequency shift control signal generator used in the frequency shifting circuit of FIG. 1.

Referring to FIG. 4, the frequency shift control signal generator 109 receives the phase data Φ from the phase accumulator 108, generates thirteen partial phases ($\Phi_{-1}$, $\Phi_0$, $\Phi_1$, ..., $\Phi_{10}$, $\Phi_{11}$) and thirteen control signals D ($D_{-1}$, $D_0$, $D_1$, ..., $D_{10}$, $D_{11}$).

Hereafter, an algorithm for generating the control signals D on the basis of the phase data Φ will be described. In FIG. 4, functional blocks for implementing the algorithm are shown. The algorithm is constructed by the following steps:

Step 1) k=−1 and $\Phi_k = \Phi$;

Step 2) $D_k$=sign bit of $\Phi_k$;

Step 3) if k=11, then exit, else go to step 4);

Step 4) $\Phi_{k+1} = \Phi_k - \theta_k$ when $D_k$=0, and
$\Phi_{k+1} = \Phi_k + \theta_k$ when $D_k$=1;

Step 5) k=k+1; and

Step 6) go to step 3).

More specifically, k is set to −1 and the phase Φ is set as $\Phi_{-1}$. If $\Phi_{-1}$ has a positive value, then the most significant bit (MSB) $D_{-1}$ of the control signal D is set to a logical value "1" and $\Phi_0$ is set to $\Phi_{-1}+90$. If $\Phi_{-1}$ has a negative value, then $D_{-1}$ is set to a logical value "0" and $\Phi_0$ is set to $\Phi_{-1}-90$.

Subsequently, it is determined whether the numerical value $\Phi_0$ obtained earlier is positive or negative. If $\Phi_0$ has a positive value, then the logical value of $D_0$ is set to 1 and $\Phi_1$ is set to $\Phi_0+\theta_0$. If $\Phi_0$ has a negative value, then $D_0$ is set to a logical value "0" and $\Phi_1$ is set $\Phi_1=\Phi_0-\theta_0$, where $\theta_0$=arctan (2°). Generally, $\theta_k$=arctan($2^{-k}$).

In succession, it is determined whether $\Phi_1$ is positive or negative. If $\Phi_1$ has a positive value, then the logical value of $D_1$ is set to 1 and $\Phi_2$ is set to $\Phi_1+\theta_1$. If $\Phi_1$ has a negative value, then $D_1$ is set to a logical value "0" and $\Phi_2$ is set to $\Phi_1-\theta_1$.

Here, $\theta_k$ to be added to or subtracted from $\Phi_k$ is supplied by twelve data selectors as indicated by reference numerals 401 to 404 depending on the sign bit of $\Phi_k$, that is, $\Phi_k$ is positive or negative. If $\Phi_k$ is positive, then $-\theta k$ is supplied to a corresponding adder. When $\Phi_k$ is negative, then $+\theta k$ is supplied the corresponding adder. Generally, if $D_k$ has a logical value "0", then $\Phi_{k+1}=\Phi_k-\theta_k$. If $D_k$ has a logical value "1", then $\Phi_{k+1}=\Phi_k+\theta_k$.

By generating $\Phi_k$ in this manner, the numerical value of $\Phi_k$ can be brought closer to 0 successively as close as possible. There is improved the precision of approximation of the rotation angel $\Theta$ by which a signal vector in the I-Q plane is rotated. Generally, if the value of k becomes larger, then $\arctan(2^{-k})$ is assumed to be approximately $2 \times \arctan(2^{-k-1})$. Therefore, this method is more effective.

Rotator and De-rotator

Figure 5:
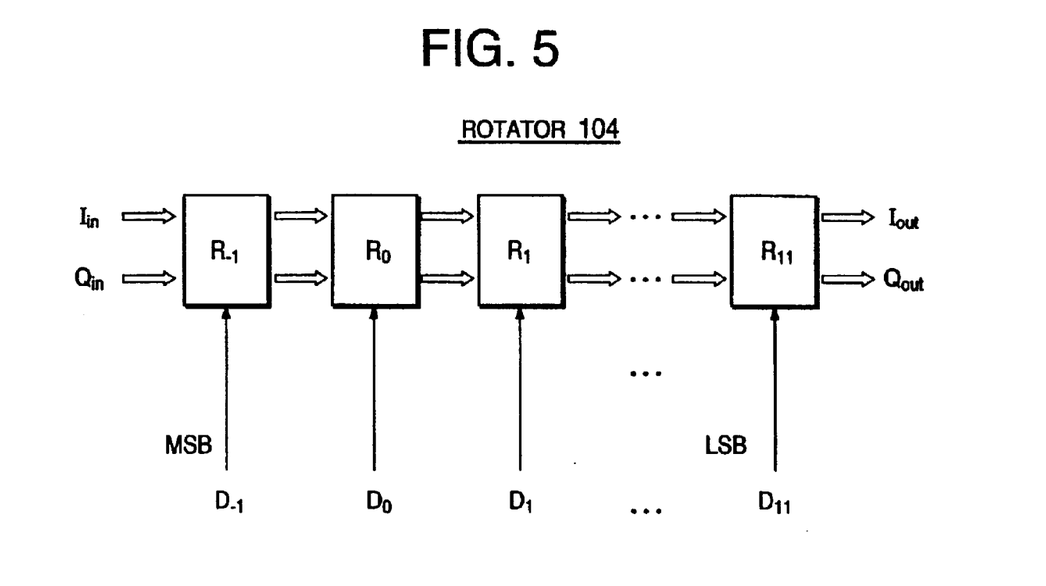
FIG. 5 is a block diagram showing a de-rotator used in the frequency shifting circuit of FIG. 1.

Referring to FIG. 5, the rotator 104 is designed to rotate a signal vector on the I-Q plane by an angle $\Theta$ determined depending on the control signals D ($D_{-1}$, $D_0$, $D_1$, ..., $D_{10}$, $D_{11}$). The rotator 104 is composed of thirteen partial rotation circuits ($R_{-1}$, $R_0$, $R_1$, $R_{10}$, $R_{11}$) which are cascade-connected. The respective control signals $D_{-1}$, $D_0$, $D_1$, ..., $D_{10}$, $D_{11}$ are provided to the partial rotation circuits $R_{-1}$, $R_0$, $R_1$, ..., $R_{10}$, $R_{11}$.

Figure 6:
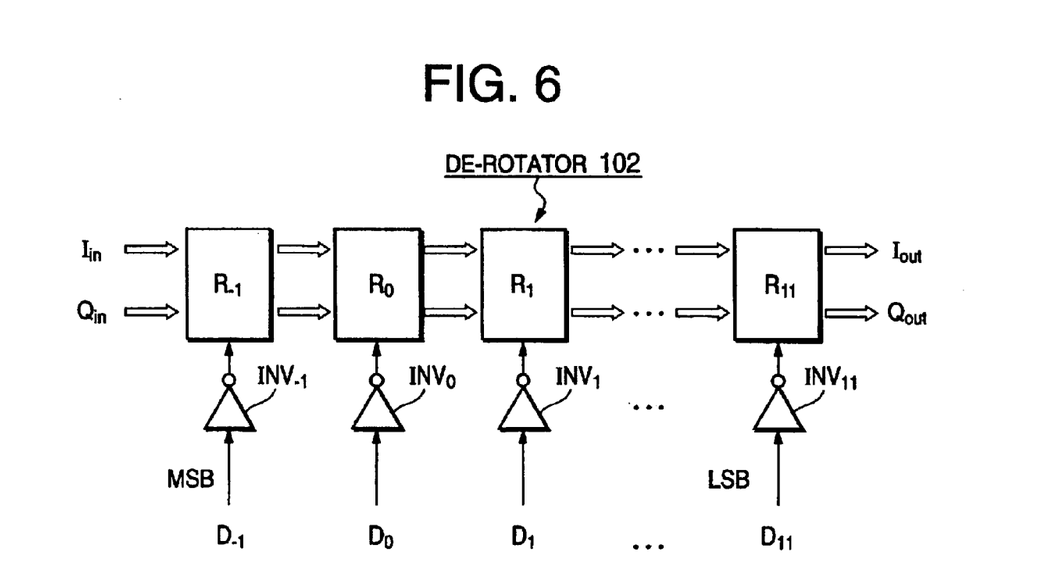
FIG. 6 is a block diagram showing a rotator used in the frequency shifting circuit of FIG. 1.

Referring to FIG. 6, the de-rotator 102 is designed to rotate a signal vector on the I-Q plane by an angle of $-\Theta$ determined depending on the control signals D ($D_{-1}$, $D_0$, $D_1$, ..., $D_{10}$, $D_{11}$). The de-rotator 102 is composed of the same partial rotation circuits $R_{-1}$, $R_0$, $R_1$, ..., $R_{10}$, $R_{11}$ as those used in the rotator 104 and inverters $INV_{-1}$, $INV_0$, $INV_1$, ..., $INV_{10}$, $INV_{11}$. The respective control signals $D_{-1}$, $D_0$, $D_1$, ..., $D_{10}$, $D_{11}$ are connected to the partial rotation circuits $R_{-1}$, $R_0$, $R_1$, ..., $R_{10}$, $R_{11}$ through the inverters $INV_{-1}$, $INV_0$, $INV_1$, ..., $INV_{10}$, $INV_{11}$.

Figure 7:
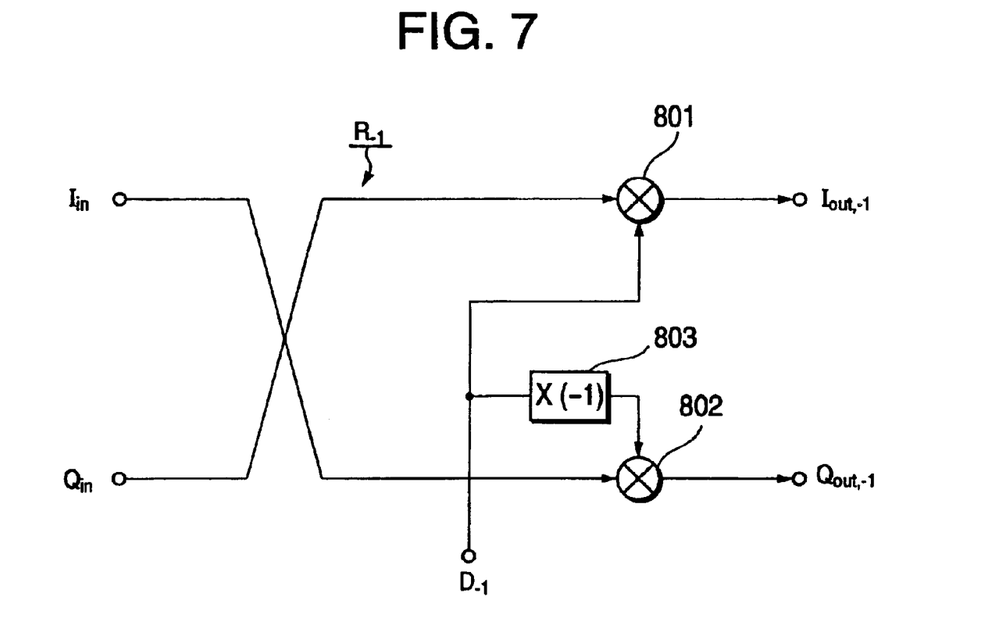
FIG.7 is a block diagram showing a partial rotation circuit used in the rotator and the de-rotator.

Referring to FIG. 7, the partial rotation circuit $R_{-1}$ at the initial stage receives the $I_{in}$ and $Q_{in}$ component signals from the A/D converter 101, and outputs $Q_{out,-1}$ and $I_{out,-1}$ component signals to the partial rotation circuit $R_0$ at the next stage.

The partial rotation circuit $R_{-1}$ includes two multipliers 801 and 802, and a sign inverter 803. The $Q_{in}$ component signal is input to the multiplier 801. The $I_{in}$ component signal is input to the multiplier 802. The control signal $D_{-1}$ is input to the sign inverter 803 and the multiplier 801. The sign inverter 803 supplies its output to the multiplier 802.

In other words, relations between inputs and outputs of the partial rotation circuit $R_{-1}$ are represented by the following equation (1):

$$I_{out,-1} = D_{-1} \times Q_{in} \text{ and}$$

$$Q_{out,-1} = -D_{-1} \times I_{in} \quad (1),$$

where $D_{-1}$ uses numerical value representation such that a numerical value "1" is represented by the logical value "1" and a numerical value "-1" is represented by the logical value "0".

The partial rotation circuit $R_{-1}$ is a circuit for rotating the signal vector (I, Q) by an angle $\theta_{-1}$. According to the equation (1), $\theta_{-1}$ is plus 90 degrees when the numerical value of the control signal $D_{-1}$ is "-1" and $\theta_{-1}$ is minus 90 degrees when the numerical value of the control signal $D_{-1}$ is "1". In this way, the partial rotation circuit $R_{-1}$ rotates the signal vector without changing the absolute value of the signal vector.

Figure 8:
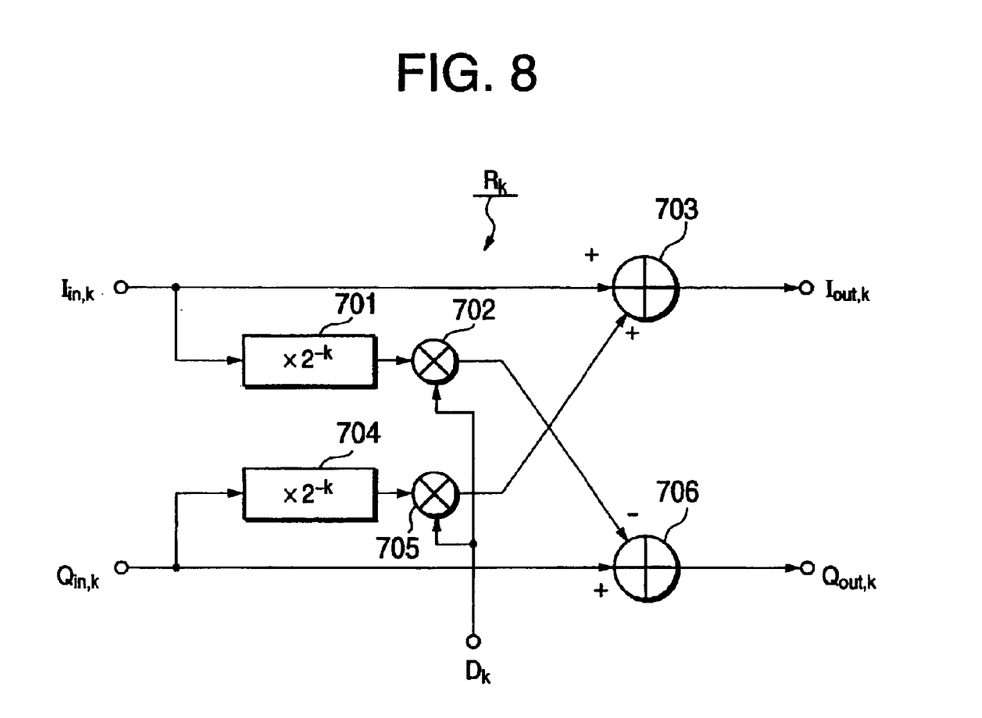
FIG. 8 is a block diagram showing an initial rotation circuit used in the rotator and the de-rotator.

Referring to FIG. 8, a partial rotation circuits $R_k$ which is any of the partial rotation circuits $R_0$ to $R_{11}$ is a circuit which receives $Q_{in,k}$ and $I_{in,k}$ from the previous stage and outputs $Q_{out,k}$ and $I_{out,k}$. The partial rotation circuit includes two constant multipliers 701 and 704, two multipliers 702 and 705, and two adders 703 and 706. The signal $I_{in,k}$ is input to the adder 703 and the constant multiplier 701. The output of the constant multiplier 701 is multiplied by a corresponding control signal Dk at the multiplier 702. The output of the multiplier 702 is inverted in sign and input to the adder 706. The signal $Q_{in,k}$ is input to the adder 706 and the constant multiplier 704. The output of the constant multiplier 704 is multiplied by a corresponding control signal Dk at the multiplier 705. The output of the multiplier 705 is input to the adder 703. In other words, relations between inputs and outputs of each of the partial rotation circuits $R_0$ to $R_{11}$, are represented by the following equation (2):

$$I_{out,k} = I_{in,k} + 2^{-k} \times D_k \times Q_{in,k} \text{ and}$$

$$Q_{out,k} = -2^{-k} \times D_k \times I_{in,k} + Q_{in,k} \quad (2),$$

where $D_k$ uses numerical value representation such that a numerical value "1" is represented by the logical value "1" and a numerical value "-1" is represented by the logical value "0".

The partial rotation circuit $R_k$ ($R_0$ to $R_{11}$) is a circuit for rotating a signal vector ($Q_{in,k}$, $I_{in,k}$) by an angle $\theta_k$. According to the above equation (2), $\theta_k$ is $+\arctan(2^{-k})$ degrees when the numerical value of the control signal $D_k$ is "-1" and $\theta_k$ is $-\arctan(2^{-k})$ degrees when the numerical value of the control signal $D_k$ is "1". In this way, each of the partial rotation circuits $R_0$ to $R_{11}$ rotates the input signal vector ($Q_{in,k}$, $I_{in,k}$) by the angle $\theta_k$. As a result of the rotation, the absolute value $Z_{in,k}$ of the input signal vector becomes proportionate to the reciprocal of $\cos\theta_k$. Therefore, the absolute value $Z_{out,k}$ of the output signal vector becomes ($Z_{in}/\cos\theta_k$).

Heretofore, the partial rotation circuits have been described. The rotator 104 is a circuit formed by cascade-connecting thirteen partial rotation circuits ($R_{-1}$, $R_0$, $R_1$, ..., $R_{10}$, $R_{11}$). When a signal vector (I, Q) having an absolute value $Z_{in}$ is input to the rotator 104, the signal vector is rotated by an angle $\Theta$ and its absolute value becomes $Z_{out}$ to output it from the rotator 104. The angle $\Theta$ and $Z_{out}$ are represented by the following equations (3) and (4).

$$\Theta = D_{-1} \times 90° + \sum_{k=0}^{11} D_k \cdot \arctan(2^{-k}) \quad (3)$$

$$Zout = \frac{Zin}{\prod_{k=0}^{11} \cos\theta_k} \quad (4)$$

Figure 9:
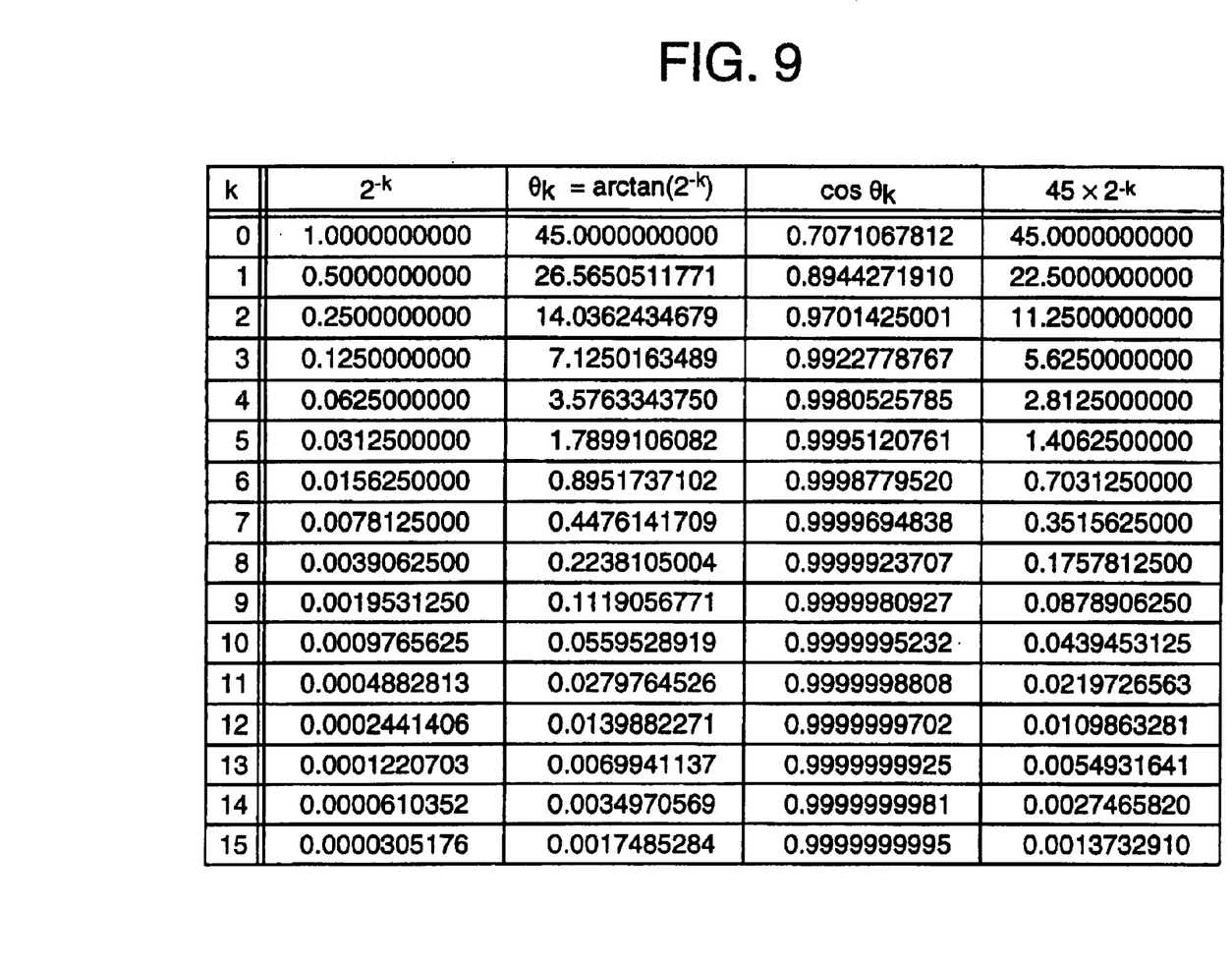
FIG. 9 is a table showing correspondence between a partial rotation angle and its cosine in each stage of the partial rotation circuits in each of the rotator and the de-rotator.

FIG. 9 is a table showing correspondence relations among k, $2^{-k}$, $\theta_k$, $\cos\theta_k$, and $45 \times 2^{-k}$. According to the table, the denominator of the right side of the equation (4) is a constant 0.6072529591.

As described above, in multi-carrier communications, in particular, multi-carrier CDMA communications, the present invention heretofore described provides a frequency shifting circuit which is simplified, reduced in power consumption, and suitable for a small-sized portable terminal. Since the frequency shifting circuit rotates a signal vector on the I-Q plane by means of digital computation, it is possible to demodulate received signals in the upper and lower bands into signals in the center band with extremely high precision.

What is claimed is:

1. A digital circuit for shifting a frequency band of a signal vector to a predetermined frequency band, wherein the signal vector is determined by a pair of I (in-phase) and Q (quadrature) components on I-Q plane, comprising:

a control data generator for generating control data from a frequency difference between the frequency band and the predetermined frequency band including a phase data generator for generating phase data from the frequency difference;

a signal vector rotator for rotating the signal vector on the I-Q plane by an angle determined depending on the control data to produce an output signal vector in the predetermined frequency band;

an analog-to-digital converter for converting a received analog signal vector to the signal vector according to a predetermined sampling clock, wherein the control data generator comprises;

the phase data generator for generating the phase data from the frequency difference in synchronization with the predetermined sampling clock; and a converter for converting the phase data to the control data consisting of a plurality of control bits, and wherein the signal vector rotator comprises;

a plurality of partial rotators which are connected in series in descending order of a rotation angle, wherein each of the partial rotators receives a different bit of the control bits of the control data and rotates an output of a previous stage by a predetermined angle depending on a corresponding control bit received from the converter.

2. A digital circuit for shifting a plurality of frequency bands of input signal vectors to a predetermined center frequency band to produce an output signal vector for each frequency band, wherein each of the input signal vectors is determined by a pair of I (in-phase) and Q (quadrature) components on I-Q plane, comprising:

an analog-to-digital converter for converting analog signal vectors to the input signal vectors according to a predetermined sampling clock;

a control data generator for generating control data from a frequency difference between each of the plurality of frequency bands and the predetermined center frequency band including a phase data generator for generating phase data from the frequency difference;

a signal vector rotator corresponding to each of the plurality of frequency bands, for rotating the input signal vectors on the I-Q plane by an angle determined depending on corresponding control data to shift the frequency bands of the input signal vectors to the predetermined center frequency band;

a band-pass filter corresponding to the signal vector rotator, for receiving an output of the signal vector rotator and passing an output signal vector of the predetermined center frequency band;

wherein the control data generator comprises:

the phase data generator for generating the phase data $\Phi$ from the frequency difference in synchronization with the predetermined sampling clock; and a converter for converting the phase data $\Phi$ to the control data D consisting of a plurality of control bits $D_k$, where $-1 < k < m-2$ (m is a positive integer), wherein the phase data generator generates the phase data $\Phi$ by computing an integral multiple of a unit angle $\Delta$ which is obtained from a frequency shift $\delta$ per period of the predetermined sampling clock, wherein the unit angle $\Delta$ is represented by $360° \times \delta$, wherein the frequency shift $\delta$ is obtained by dividing the frequency difference by a frequency of the predetermined sampling clock and is represented in form of $RN/2^m$ (RN is a rational number).

3. The digital circuit according to claim 2, wherein the converter performs a conversion operation according to the following steps:

Step 1) $k=-1$ and $\Phi_k=\Phi$;

Step 2) $D_k$=sign bit of $\Phi_k$;

Step 3) if $k=m-2$, then exit, else go to step 4);

Step 4) $\Phi_{k+1}=\Phi_k-\theta_k$ when $D_k=0$, and $\Phi_{k+1}=\Phi_k+\theta_k$ when $D_k=1$, where $\theta_k=\arctan(2^{-k})$;

Step 5) $k=k+1$; and

Step 6) go to step 3).

4. The digital circuit according to claim 3, wherein the signal vector rotator comprises:

a plurality of partial rotators $R_k$ which are connected in series in descending order of a rotation angle, wherein the partial rotators $R_k$ receive the control bits $D_k$, respectively, and each of the partial rotators $R_k$ rotates an output of a previous stage $R_{k-1}$ by a predetermined angle depending on a corresponding control bit received from the converter.

5. The digital circuit according to claim 4, wherein a first partial rotator $R_1$ rotates an input signal vector ($I_{in}$, $Q_{in}$) by an angle $\theta_{-1}$ to produce a first output signal vector ($I_{out,-1}$, $Q_{out,-1}$) as follows:

$I_{out,-1}=D_{-1}=Q_{in}$; and $Q_{out,-1}=-D_{-1} \times I_{in}$, each of partial rotators $R_k$ ($0<k \leq m-2$) rotates an input signal vector ($I_{in,k}$, $Q_{in,k}$) by an angle $\theta_k$ to produce an output signal vector ($I_{out,k}$, $Q_{out,k}$) as follows:

$I_{out,k}=I_{in,k}+2^{-k} \times D_k \times Q_{in}$; and $Q_{out,k}=-2^{-k} \times D_k \times I_{in,k}+Q_{in,k}$, where $D_k$ uses numerical value representation such that a numerical value "1" is represented by a logical value "1" and a numerical value "-1" is represented by a logical value "0".

6. The digital circuit according to claim 4, wherein the signal vector rotator rotates an input signal vector ($I_{in}$, $Q_{in}$) having an absolute value $Z_{in}$ by an angle $\theta$ while the absolute value $Z_{in}$ becomes $Z_{out}$, where $\theta$ and $Z_{out}$ are represented as follows:

$$\Theta = D_{-1} \times 90° + \sum_{k=0}^{m-2} D_k \cdot \arctan(2^{-k}) \text{ and}$$

$$Zout = \frac{Zin}{\prod_{k=0}^{m-2} \cos\theta_k}.$$

* * * * *